UNITED STATES PATENT OFFICE.

KARL KREKELER AND EDUARD MARTZ, OF ELBERFELD, GERMANY, ASSIGNORS TO THE FARBENFABRIKEN OF ELBERFELD COMPANY, OF NEW YORK, N. Y.

GREEN TRISAZO DYE.

SPECIFICATION forming part of Letters Patent No. 603,645, dated May 10, 1898.

Application filed December 14, 1897. Serial No. 661,860. (Specimens.) Patented in Germany September 15, 1891, No. 65,262; in England December 28, 1891, No. 22,641; in France April 28, 1892, No. 221,233; in Italy June 30, 1892, XXVI, 32,191, LXIII, 186, and in Austria-Hungary October 3, 1892, No. 1,242 and No. 16,870.

*To all whom it may concern:*

Be it known that we, KARL KREKELER and EDUARD MARTZ, doctors of philosophy, chemists, residing at Elberfeld, Germany, (assignors to the FARBENFABRIKEN OF ELBERFELD COMPANY, of New York,) have invented a new and useful Improvement in the Manufacture of Green Trisazo Dyes, (for which the Farbenfabriken, vormals Fr. Bayer & Co., of Elberfeld, Germany, has already obtained Letters Patent in Germany, No. 65,262, dated September 15, 1891; in England, No. 22,641, dated December 28, 1891; in France, No. 221,233, dated April 28, 1892; in Italy, Reg. Gen., Vol. XXVI, No. 32,191, Reg. Att., Vol. LXIII, No. 186, dated June 30, 1892, and in Austria-Hungary, No. 1,242 and No. 16,870, dated October 3, 1892;) and we hereby declare the following to be a clear and exact description of our invention.

Our invention relates to the production of a new class of trisazo dyestuffs by diazotizing tetrazo bodies of the general formula

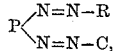

in which formula P represents a radical of the benzidin series, such as diphenyl, ditolyl, diphenol ether, or the like; R, the radical of an orthooxycarbonic acid of the benzene series, such as salicylic acid or cresotinic acid, and C the radical of the so-called "Clève's" alpha-naphthylamin-beta-sulfonic acid, (1.6 or 1.7,) and combining the diazo body thus obtained with one molecule of a mono or disulfo acid of 1.8 amidonaphthol. The dyestuffs thus obtained have the general formula

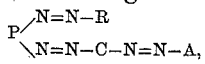

P, R, and C meaning in this formula the above-defined radicals; A, the radical of a mono or disulfo acid of 1.8 amidonaphthol. They represent black powders, which dissolve in water with green color and dye cotton green shades.

In carrying out our new process practically we can proceed as follows: 18.4 kilos, by weight, of benzidin are diazotized in the usual manner by means of fourteen kilos, by weight, of sodium nitrite. To the icy-cold diazo solution an icy-cold solution of fourteen kilos, by weight, of salicylic acid and seventy kilos, by weight, of sodium carbonate ($Na_2CO_3$) in four hundred liters of water is added with stirring. When the formation of the intermediate product is finished, a cold solution, prepared by dissolving 24.5 kilos, by weight, of the sodium salt of Clève's alpha-naphthylamin-beta-monosulfo-acid (1.6) in three hundred liters of water, is added. After about a three hours' stirring the formation of the intermediate dyestuff is complete.

The mixture is subsequently acidulated by means of hydrochloric acid and filtered. The dyestuff acid thus obtained is dissolved in fifteen hundred liters of a 2.5 per cent. soda-lye, then quickly mixed with a solution of eight kilos, by weight, of sodium nitrite, five hundred kilos, by weight, of ice, and one hundred and fifty kilos, by weight, of hydrochloric acid, (20° Baumé.) This mixture is stirred for about twelve hours, and then the resulting insoluble diazo compound is filtered and pressed. Subsequently it is mixed with ice and water to a thin paste, which is slowly stirred into an icy-cold concentrated solution of 36.3 kilos, by weight, of the sodium salt of 1.8 amidonaphthol 2.4 disulfo-acid, and one hundred and forty kilos, by weight, of sodium carbonate. After stirring for twelve hours the mixture is heated to about 70° centigrade. The dyestuff thus complete is salted out in the usual manner. Then it is filtered off, pressed, dried, and pulverized. It is the sodium salt of an acid having the formula

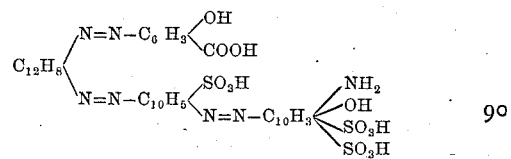

and represents a black powder easily soluble in water with a green color, in concentrated sulfuric acid with a dark-blue color. From this solution a greenish-black precipitate is obtained on the addition of a sufficient quantity of ice.

The new coloring-matter dyes unmordanted cotton green shades.

Having now described our invention and in what manner the same is to be performed, what we claim as new, and desire to secure by Letters Patent, is—

1. The process for producing new trisazo dyestuffs by combining the diazo derivatives of the disazo compounds hereinbefore defined of the general formula

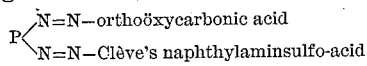

with one molecule of a mono or di sulfo acid of 1.8 amidonaphthol, substantially as hereinbefore described.

2. The process for producing a new trisazo dyestuff by combining the diazo derivative of the disazo body having the formula

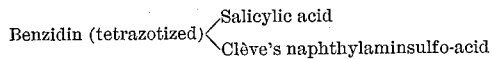

with one molecule of 1.8 amidonaphthol 2.4 disulfo-acid substantially as hereinbefore described.

3. As new articles of manufacture the new trisazo dyestuffs obtainable from the diazo derivatives of the disazo compounds of the general formula:

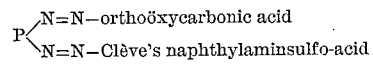

by combination with one molecule of a mono or di sulfo acid of 1.8 amidonaphthol, being black powders, soluble in water with green color, dyeing unmordanted cotton green shades substantially as described.

4. As a new article of manufacture the specific dyestuff obtainable from the diazo derivative of the disazo body having the formula

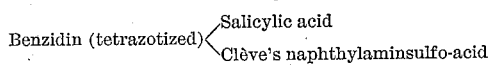

by combination with one molecule of 1.8 amidonaphthol 2.4 disulfo-acid, being an alkaline salt of an acid having the formula

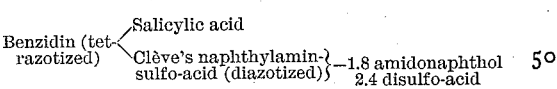

representing in the form of the sodium salt a black powder, soluble in water with a green color, in concentrated sulfuric acid with a dark-blue color from which solution a greenish-black precipitate is obtained on the addition of a sufficient quantity of ice, dyeing unmordanted cotton green shades substantially as described.

In testimony whereof we have signed our names in the presence of two subscribing witnesses.

KARL KREKELER.
EDUARD MARTZ.

Witnesses:
R. E. JAHN,
OTTO KÖNIG.